United States Patent
Mohr

(10) Patent No.: US 7,032,859 B2
(45) Date of Patent: Apr. 25, 2006

(54) COUNTER ROTATING DUCTED FAN HAVING A PERMANENT MAGNET DRIVE

(75) Inventor: John Anthony Mohr, Camarillo, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 145 days.

(21) Appl. No.: 10/901,396

(22) Filed: Jul. 23, 2004

(65) Prior Publication Data

US 2006/0016929 A1 Jan. 26, 2006

(51) Int. Cl.
*B64C 27/22* (2006.01)
*B64C 29/00* (2006.01)
*B64C 39/00* (2006.01)
*F04B 35/04* (2006.01)
*H02K 21/12* (2006.01)

(52) U.S. Cl. .................. 244/12.2; 244/12.3; 244/23 B; 244/23 C; 417/356; 417/423.7; 310/114; 310/156.53; 310/156.56

(58) Field of Classification Search .............. 310/112, 310/114, 156.53, 156.56, 261, 267, 268, 68 R; 244/12.2–12.4, 12.17, 17.11, 21, 23 A, 23 B–23 C; 417/356, 423.7, 423.12, 423.14, 423.3, 53
See application file for complete search history.

(56) References Cited

U.S. PATENT DOCUMENTS

| 2,952,422 A | * | 9/1960 | Fletcher et al. ............ 244/12.2 |
| 4,553,075 A | * | 11/1985 | Brown et al. ................ 318/254 |
| 5,178,344 A | * | 1/1993 | Dlouhy ........................ 244/12.2 |
| 5,419,513 A | * | 5/1995 | Flemming ................... 244/12.2 |
| 5,616,974 A | * | 4/1997 | Yamada ..................... 310/68 B |
| 5,653,404 A | * | 8/1997 | Ploshkin ..................... 244/12.2 |
| 5,765,776 A | * | 6/1998 | Rogers et al. ............. 244/12.2 |
| 6,208,054 B1 | | 3/2001 | Tajima et al. |
| 6,575,402 B1 | * | 6/2003 | Scott .......................... 244/12.2 |
| 6,727,620 B1 | * | 4/2004 | White et al. ................. 310/112 |
| 6,809,456 B1 | * | 10/2004 | Yun ............................ 310/261 |
| 2004/0042916 A1 | * | 3/2004 | Masterton .................... 417/356 |
| 2004/0061022 A1 | | 4/2004 | Paul |
| 2005/0067908 A1 | * | 3/2005 | Nai et al. ..................... 310/112 |
| 2005/0147501 A1 | * | 7/2005 | Cheng et al. .................. 417/53 |

OTHER PUBLICATIONS

Rick Noling, "The Case For Electric Motors", Journal, Jul./Aug. 2004, pp. 20-23, vol. 22 #4, Publisher: AUVSI for the Unmanned Systems Industry, Arlington, Virginia.

* cited by examiner

*Primary Examiner*—Tran Nguyen
(74) *Attorney, Agent, or Firm*—David S. Kalmbaugh

(57) ABSTRACT

A counter rotating ducted fan having a permanent magnet drive, comprising a ducted housing having an iron core stator and a pair of counter rotating propeller blades rotationally mounted on a propeller shaft positioned axially within the housing Each of the propeller blades includes a plurality of individual propeller blades of an even number. Permanent magnets are mounted in permanent magnet insertion holes located at the tip of each of the individual propeller blades. When excited by an electrical current a pair of excitation windings mounted within the iron core stator control the rotational speed and direction of the pair of counter rotating propeller blades.

20 Claims, 5 Drawing Sheets

COUNTER ROTATING DUCTED FAN HAVING A PERMANENT MAGNET DRIVE

BACKGROUND OF THE INVENTION

1. Field of the Invention

The present invention relates generally to a ducted fan drive. More specifically, the present invention relates to a drive for counter rotating ducted fans which uses permanent magnets as an integral component of the drive system.

2. Description of the Prior Art

In the past, electric rotating machines included permanent magnet electric rotating machine, in which permanent magnets of the electric rotating machine are used as a magnetic field generating means for the rotor of the machine. In this type of rotating machines, plural permanent magnets of the electric rotating machine are arranged in parallel and fixed on a surface of the rotor and additional permanent magnets are arranged to have a reversed polarity at a peripheral direction.

Referring to FIGS. 1A and 1B, U.S. Pat. No. 6,208,054, which issued Mar. 27, 2001 to Fumio Tajima et al, discloses a prior art permanent magnet electric rotating machine, designated generally by the reference numeral 10. The invention of U.S. Pat. No. 6,208,054 comprises a permanent magnet electric rotating machine which includes a stator 11 and a rotor 12. As shown in FIG. 1A, the stator 11 and the rotor 12 are arranged with a rotation air gap formed between one another. The stator 11 is fixed to an inner peripheral surface of a housing 21 and a shaft 17, which is inserted in and fixed to the rotor 12, can rotate freely with a rotation air gap against the stator 11.

The stator 11 comprises a stator iron core 13 and a stator winding 14. The stator iron core 13 includes a core portion 15 and a stator salient pole portion 16. In the core portion 15, a magnetic circuit is formed so as to pass a magnetic flux to the stator salient pole portion 16. In this stator salient pole portion 16, the stator winding 14 is wound around in a concentrated manner. The rotor 12 includes a shaft 17, a rotor iron core 18 and a plurality of permanent magnets 19. In the rotor iron core 18, there are a plurality of permanent magnet insertion holes 20, in which are inserted the permanent magnets 19. The holes 20 for the permanent magnets 19 and the hole through which the shaft 17 passes punched out in an axial direction. The permanent magnets 19 are inserted in and fixed respectively to the permanent magnet insertion holes 20. The shaft 17 is inserted in and fixed to the shaft passing through hole.

By arranging the permanent magnets 19 around the rotor 12 in a ring-like form, a member formed between adjacent permanent magnet insertion holes 20 can function as an auxiliary magnetic pole 26. As shown in FIG. 1A, the permanent magnets 19 are arranged separately and equally around the circumference at the same distance in the respective permanent magnet insertion holes 20 of the rotor 12.

This allows a control apparatus (not shown in FIG. 1A) to control a composite force of an armature electromotive force according to the stator winding 14 so as to direct a force toward a side of a rotation direction but not direct a force toward a side of a central position direction of the auxiliary magnetic pole 26.

A magnetic flux generated from the stator winding 14 passes through the permanent magnets 19 and the auxiliary magnetic poles 16. A reluctant torque is then generated. This force is very effective in particular during a low speed operating condition of the permanent magnet electric rotating machine. Further, since the above stated reluctant torque is added to an ordinary torque provided by the permanent magnets 19, a high torque for the electric motor, is obtained.

Referring to FIG. 1B, there is shown an axial direction cross-sectional view of the prior art permanent magnet electric rotating machine of FIG. 1B. As shown in FIG. 1B, a magnetic gap 24 is provided between the permanent magnet 19 and the auxiliary magnetic pole portion 26, wherein the magnetic gap 24 is provided between the plurality of permanent magnets 19 and the auxiliary magnetic pole portions 16 to change the magnetic flux density of the permanent magnets 19 and the auxiliary magnetic pole portions 26 smoothly and to reduce cogging torque.

SUMMARY OF THE INVENTION

The counter rotating ducted fan having a permanent magnet drive for use with a vehicle which requires lift comprises a ducted housing having an iron core stator and a pair of counter rotating propeller blades rotationally mounted on a propeller shaft positioned axially within the housing. Each of the counter rotating propeller blades includes a plurality of individual propeller blades of an even number. For example, each of the counter rotating propeller blades may include six, eight, ten or sixteen individual propeller blades.

There are permanent magnets mounted in permanent magnet insertion holes located at the tip of each of the individual propeller blades. When excited by an electrical current a pair of excitation windings mounted within the iron core stator control the rotational speed and direction of the pair of counter rotating propeller blades.

There is also an electromagnetic drive controller connected to the excitation windings which supplies electrical current to the excitation windings, controlling the magnitude and direction of current flow which, in turn, controls the speed of rotation and the direction of rotation of each of the pair of counter rotating propeller blades.

The counter rotating ducted fan having a permanent magnet drive may be used in a number of vehicles such as vertical take off and landing aircraft, an automobile which capable of flight as well as ground travel, and UAV's of all sizes, miniature to large.

DETAILED DESCRIPTION OF A PREFERRED EMBODIMENT

Figure 3:
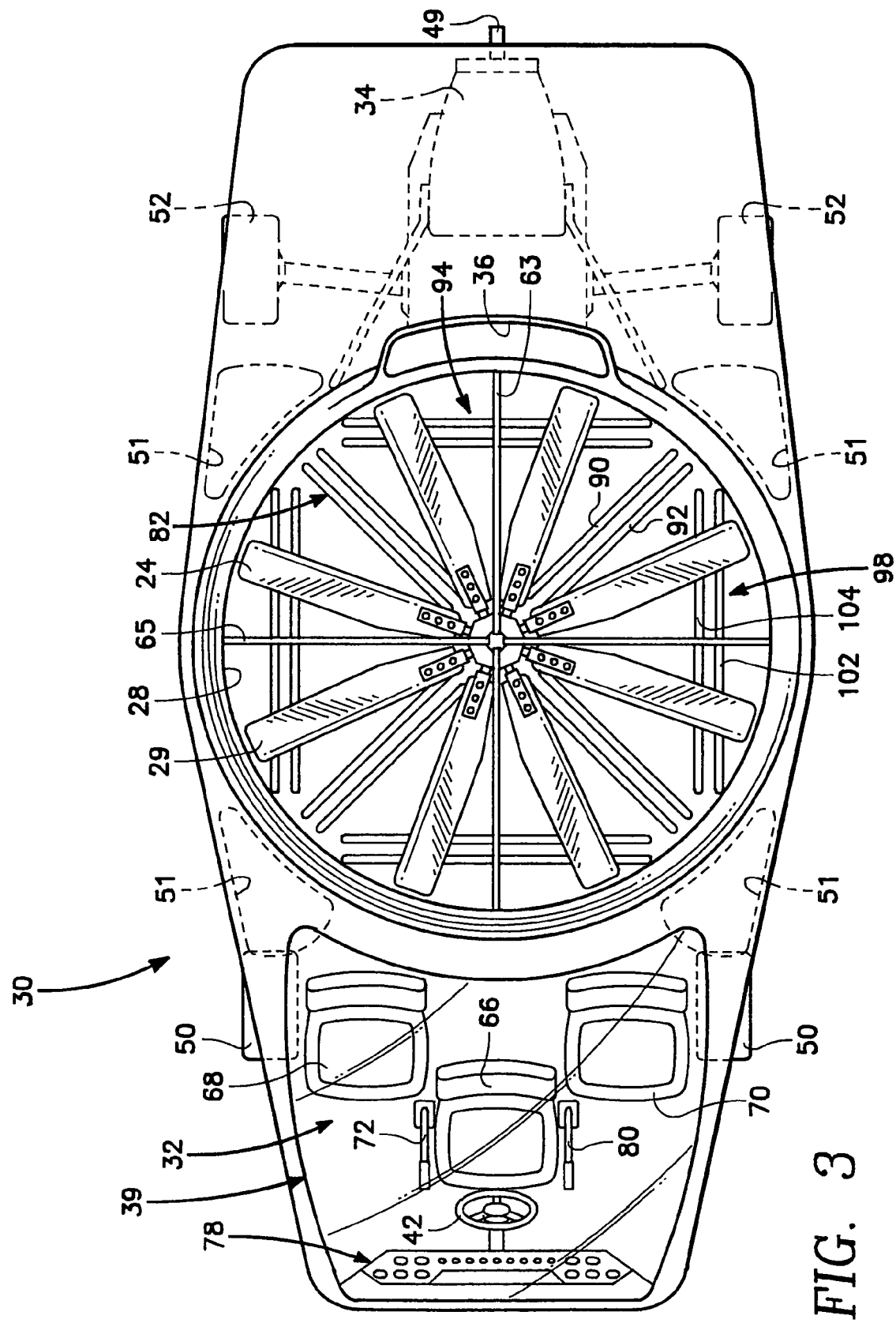
FIG. 3 is a top view of a counter rotating ducted fan flying vehicle which utilizes a counter rotating ducted fan having a permanent magnet drive as the drive source during flight.
Figure 5:
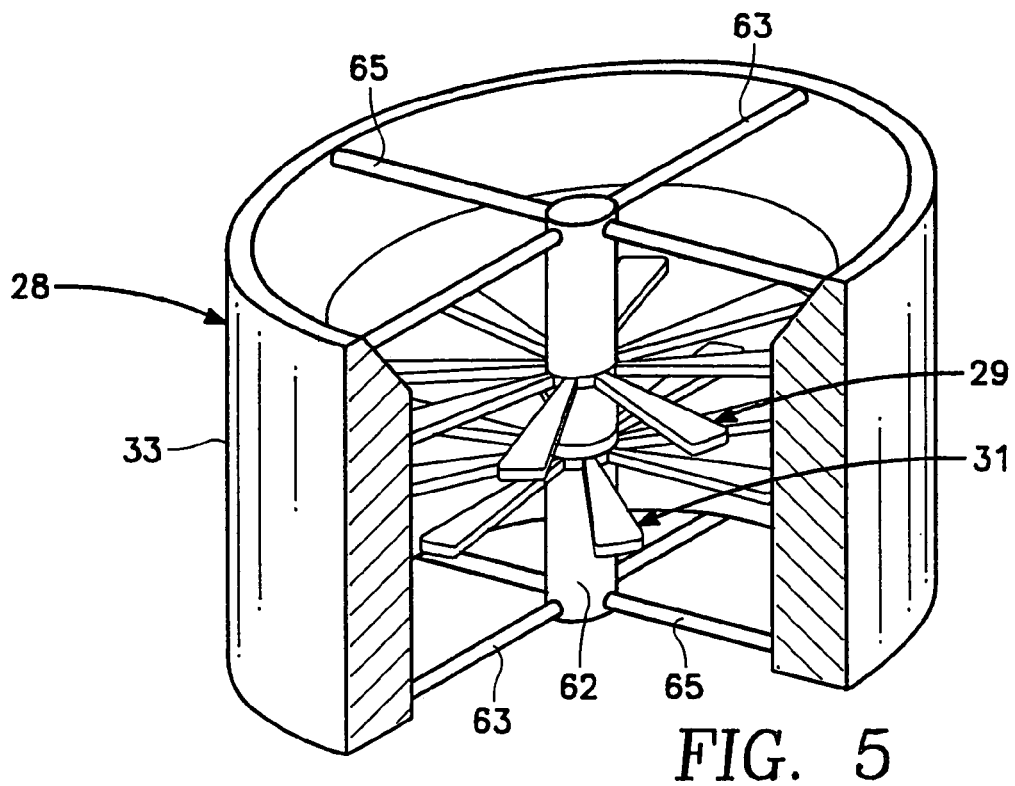
FIG. 5 is a perspective view illustrating the ducted housing and counter rotating propeller blades for the preferred embodiment of the present invention.

Referring to FIGS. 3 and 5, there is shown in FIG. 3, there is shown a counter rotating ducted fan flying vehicle/car 30 which utilizes a counter rotating ducted fan having a permanent magnet drive as the drive source, i.e. lift and forward thrust during flight. Vehicle 30 allows a user to drive vehicle 30 on a roadway, highway and city street and also to take off vertically from the roadway and fly to the user's destination. While flying vehicle 30 will still require permitted landing and take of locations, once in the air vehicle 30 will fly like an aircraft and follow standard FAA rules and regulations for aircraft such as helicopters propeller driven aircraft and jet engine aircraft.

Vehicle 30 is designed for use on roadways, city and side streets and freeways and meets the legal requirements for use of these roadways. For flight, vehicle 30 has a pair of counter rotating propeller blades/fans 29 and 31 (depicted in FIG. 5) to provide vertical lift when vehicle 30 is in flight between ground destinations. Rotating propeller blades/fans 29 and 31 are internal to vehicle 30 and thus are not exposed to external elements within the atmosphere. The cruising altitude for vehicle/car 30 is from about 1000 feet to about 20,000 feet.

Referring to FIGS. 3 and 5, the pair of counter rotating propeller blades 29 and 31 for vehicle 30 are located in a ducted housing 28 (FIG. 5). Counter rotating propeller blades 29 and 31 are approximately 7'8" in length which allows blades 29 and 31 to fit on a highway when vehicle 30 is traveling on the highway. The ducted housing 28 for car 30 may be fabricated from a material which has strong electromagnetic field generating properties. The total width of vehicle 30 is within the 104 inch width limitation of most highways and other roadways. The overall length of vehicle 30 can range from about 16 to about 22 feet depending on the model of vehicle 30 being utilized by a user of vehicle 30.

The counter rotating propeller blades 29 and 31 of vehicle 30 have in flight adjustable pitch similar to that of the propeller blades of a helicopter. Counter rotating propeller blades 29 and 31 are connected to a control and steering system located in the cockpit 32 of flying vehicle 30. Vehicle/car 30 also has an engine 34 in the aft section of flying car 30. The air intake 36 for the engine 34 is also located in the aft section of flying vehicle 30 behind the ducted housing 28.

The engine 34 is a light weight engine with a transmission coupled to the rear axle of flying vehicle/car 20. Engine 48 is the means for powering the flying vehicle 20 on a street or on a highway. The engine 34 provides sufficient power to allow flying car 30 to travel at speeds of up to 70 mph which is generally the highest allowable speed on most highways.

Engine 34 may be a conventional gasoline engine, a diesel fuel engine or a gas turbine engine. When engine 34 is a gasoline engine, the engine 34 is also equipped with smog control equipment which flying vehicle 30 must have when driven in areas with strict smog control requirements. The front and rear wheels 50 and 52 have independent shock suspensions and the front wheels 50 of vehicle 30 are steerable while vehicle 20 is on a roadway using steering wheel 42 which is located in the cockpit 32 of flying vehicle 30.

The cockpit 32 for vehicle 30 is located in front of the ducted housing 28 of flying vehicle 30 and can accommodate from one to three passengers, with one passenger being seated in a driver seat 66 and the remaining passengers being seated in passenger seats 68 and 70. Cockpit 32 has a cockpit windshield 39 which allows the driver/pilot of flying vehicle 30 to observe the roadway and the air space ahead of vehicle 30. Cockpit windshield may include a heads up display for use by the driver/pilot of vehicle 30 when vehicle 30 is in a flight mode of operation. The control and steering system of flying vehicle 30 is also located within the cockpit 32 of flying vehicle 30. The control and steering system provides a means for the user to control the air speed, altitude and steer flying vehicle 30 when flying vehicle 30 is in a flight mode of operation and also provides a means for controlling the speed of and steering flying vehicle 30 when flying vehicle 30 is a ground travel mode of operation. The control and steering system includes a steering wheel 42 which allows a user of flying vehicle 30 to steer flying vehicle 30 on a highway or other roadway; a gas pedal for controlling the speed of the flying vehicle 30 while on the roadway and a brake pedal for bringing the flying vehicle 30 to a complete stop while a driver is driving vehicle 30 on the roadway. There is also a hand brake handle 72 located on the right side of the driver seat 66 which the driver uses to set an emergency brake when flying vehicle 30 is in park. The instrument panel 78 for flying vehicle 30 is also located in the cockpit 32 of flying vehicle 30. The instrument panel 78 includes a ground travel mileage indicator, a fuel indicator, an electrical charge indicator, a speed indicator in miles per hour, an RPM indicator, a brake light indicator as well as a engine overheat indicator and other indicators generally found in automobiles.

When flying vehicle/car 30 transitions to a flying mode of operation, the user has helicopter type controls available in the cockpit 32 to make the transition from an automobile driver to a helicopter/aircraft pilot in an extremely short period of time. Yaw pedals, located on the floor board of cockpit 32 as well as steering wheel 42, and a collective pitch control handle 80 allow the user to steer and control the altitude of flying car 30 when flying car 30 is in the flying mode of operation. Specifically, a left yaw pedal allows the user to execute a left turn of flying vehicle 30 and a right yaw pedal allows the user to execute a right turn of flying vehicle 30. Steering wheel 42 is used to control forward and backward motion of flying vehicle 30 as well as left sideways motion and right sideways motion of flying vehicle 30.

The cockpit instrument panel 78 is generally the same as the instrumentation panel of a helicopter. Instrument panel 78 includes aircraft engine instrumentation/flight instrumentation indicators such as an altimeter, vertical speed indicator, airspeed indicator, artificial horizon indicator, and other normal aircraft flight instrumentation indicators are included within cockpit instrument panel 78.

Flying vehicle 30 has counter rotating propeller blades/fans 29 and 31 which is the lift source when flying vehicle/car 30 is in a flight mode of operation and a gasoline engine 34 which is utilized when flying car 30 is traveling on a highway or other roadway. Attached to gasoline engine 34 is a muffler and exhaust pipe 49 for venting engine exhaust. Counter rotating propeller blades/fans 29 and 31 may have a capacity rating equivalent to an 300 hp engine to a 30,000 hp engine with the higher horsepower rating being used in military type vehicles and the lower horsepower rating being used in commercial vehicles. The four fuel tanks 51 which store fuel for the engine 34 are arranged symmetrically about ducted housing 28 in the manner illustrated in FIG. 3. The arrangement of the fuel tanks 51 within vehicle 30 is for balancing the fuel load within vehicle 30.

The flying vehicle 30 has four angled direction control vane assemblies 82. Each of the angled direction control vane assemblies 82 comprises a pair of identical elongated direction control vanes 90 and 92 which are parallel to one another. The angled direction control vane assemblies 82 allow the user of vehicle 30 to execute left and right turns, that is the user of vehicle 30 may turn vehicle 30 in a new direction, either to the left or to the right.

Flying vehicle 30 also has first and second forward/reverse direction control vane assemblies 94 and first and second sideways direction control vane assemblies 98. Each forward/reverse direction control vane assembly 94 and each sideways direction control vane assembly 98 has a pair of identical elongated direction control vanes 102 and 104 which are parallel to one another. The forward/reverse direction control vane assemblies 94 allow the user of vehicle 20 to control movement of vehicle 20 in the forward direction and the reverse direction. In a like manner, the sideways direction control vane assemblies 98 allow the user of vehicle 30 to control movement of vehicle 30 by sliding sideways to the right and by sliding sideways to the left.

One end of propeller blade shaft 62 (FIG. 5) engages a pair of upper end shaft support members 63 and 65 (FIG. 3) which are perpendicular to one another and which provide support for shaft 62 as well as counter rotating propeller blades/fans 29 and 31 (depicted in FIG. 5). Similarly, the opposite end of propeller blade shaft 61 engages a pair of lower end shaft support members (reference numerals 63 and 65) which are perpendicular to one another and which provide support for 62 as well as counter rotating propeller blades/fans 29 and 31.

The propeller blade shaft 62 is in a fixed position with respect to the upper and lower end shaft support members, that is shaft 62 does not rotate. The counter rotating propeller blades/fans 29 and 31 are rotatably mounted on the propeller blade shaft 62. Bearings allows for rotational movement of the propeller blades 29 and 31 in opposite directions about the propeller blade shaft 62.

Figure 1A:
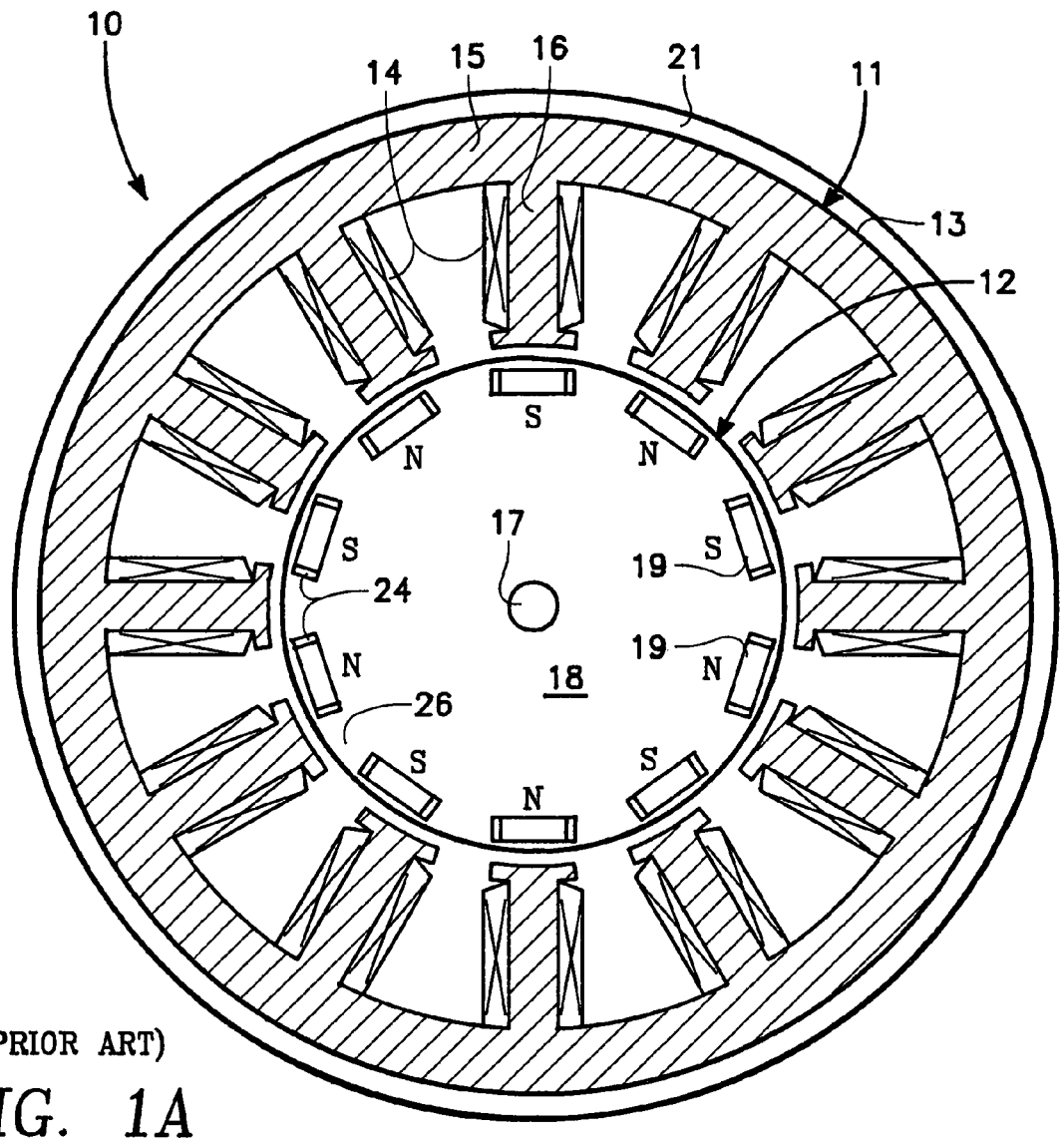
FIG. 1A is an end cross-sectional view showing a prior art permanent magnet electric rotating machine.
Figure 1B:
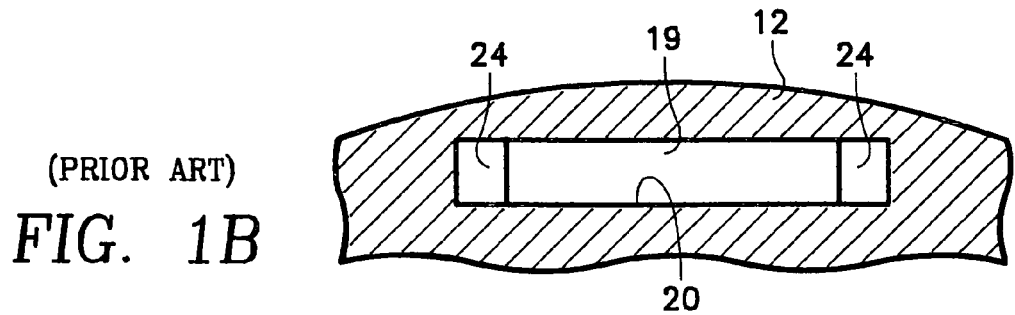
FIG. 1B is an axial direction cross-sectional view of the prior art permanent magnet electric rotating machine of FIG. 1B.
Figure 2:
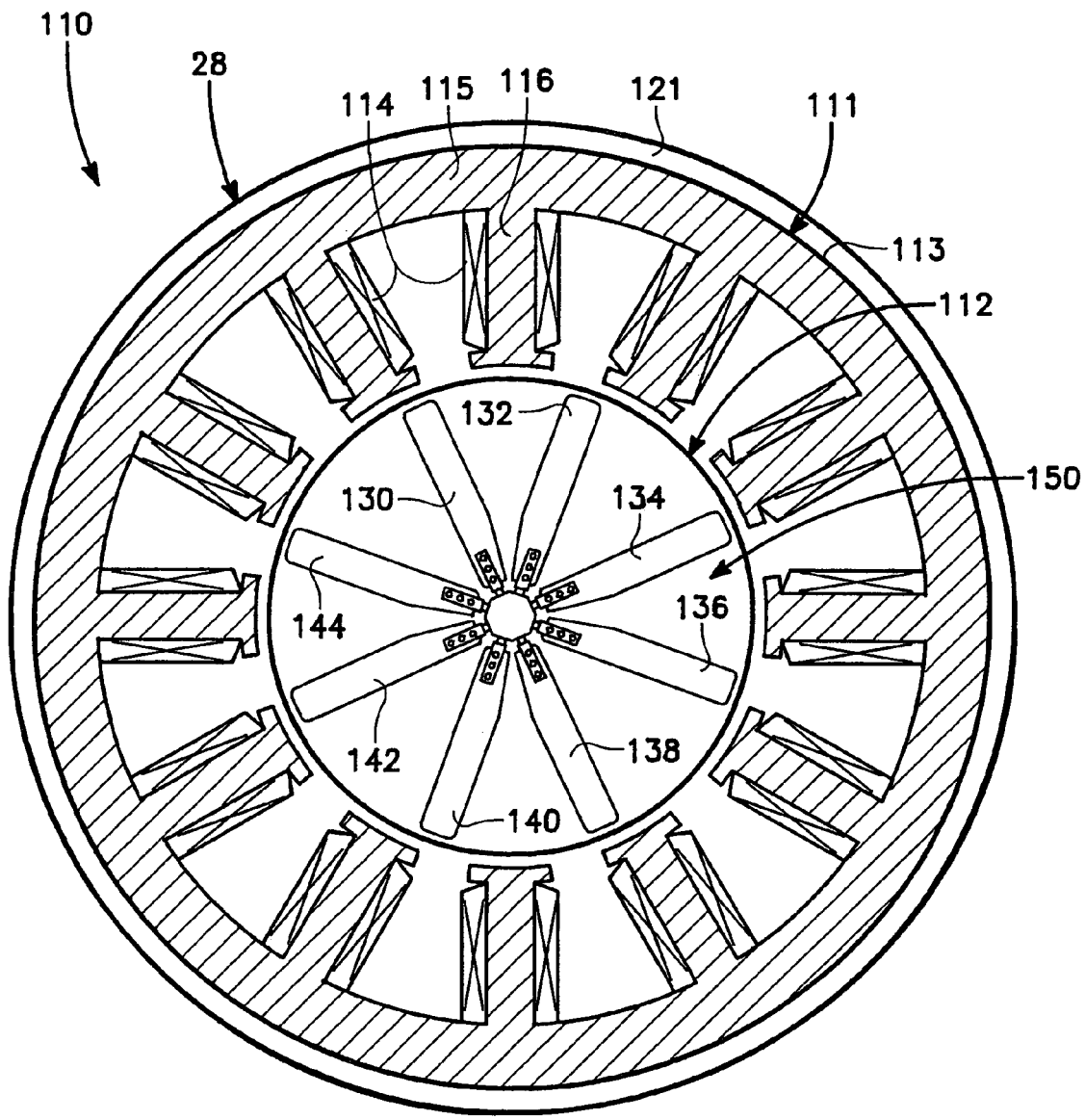
FIG. 2 is an end view of counter rotating propeller blades which have a permanent magnet drive and which constitutes a preferred embodiment of the present invention.
Figure 4:
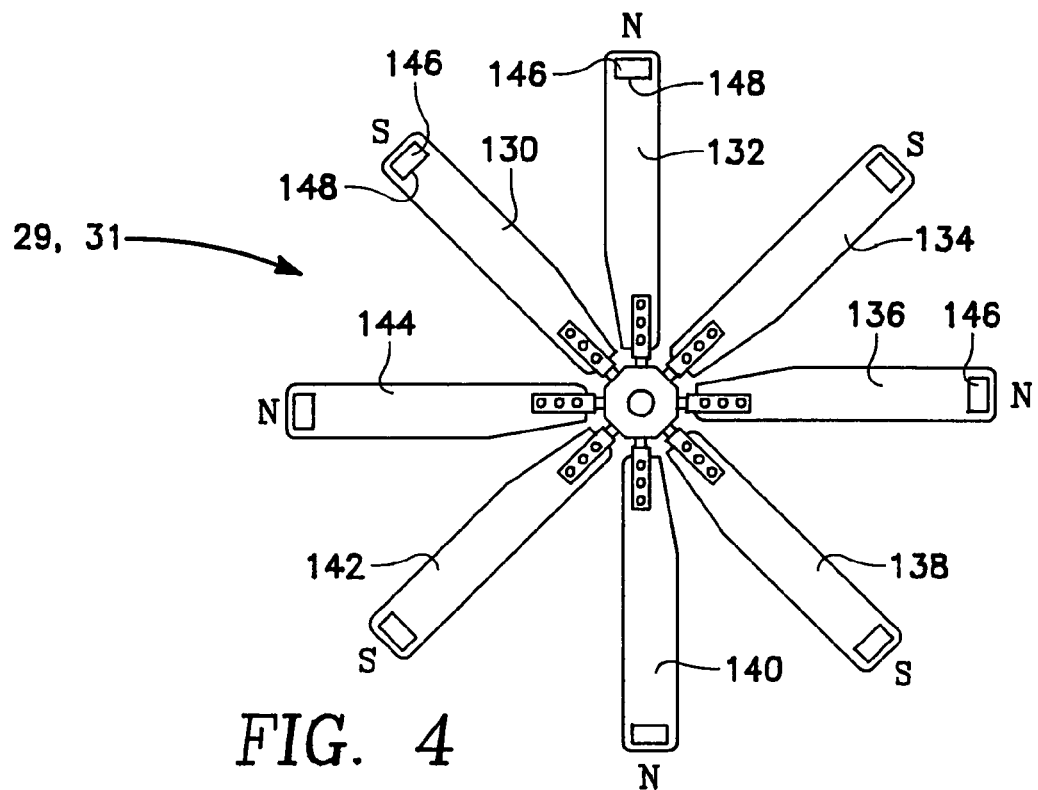
FIG. 4 illustrates the blade arrangement for each of a pair of counter rotating propeller blades/fans which provide vertical lift when the flying vehicle of FIG. 4 is in a flight mode.

Referring to FIGS. 2, 4 and 5, each of the propeller blades 29 and 31 has eight individual blades 130, 132, 134, 136, 138, 140, 142, and 144. Each of the individual blades 130, 132, 134, 136, 138, 140, 142, and 144 includes a permanent magnet 146 which is positioned at the tip of each blade 130, 132, 134, 136, 138, 140, 142, and 144. The permanent magnets 146 are mounted in permanent magnet insertion holes 148 located at the tip of each of the individual blades 130, 132, 134, 136, 138, 140, 142 and 144. The insertion holes may also have magnetic gaps, identical to the magnetic gap 24 illustrated in FIG. 1B. The permanent magnets 146 are arranged in a ring like manner separately and equally spaced apart around the edges of the individual propeller blades to form an auxiliary magnetic pole 150 between adjacent permanent magnets and 146 and their associated insertion holes 148.

At this time, it should be noted that the propeller blades 29 and 31 may each have more than eight individual propeller blades or less than eight individual propeller blades. It should be understood that the number of individual blades is an even number, and that the individual propeller blades have permanent magnets which are arranged alternatively as north, south, north, south poles within each of the counter rotating propeller blades/fans 29 and 31

Figure 6:
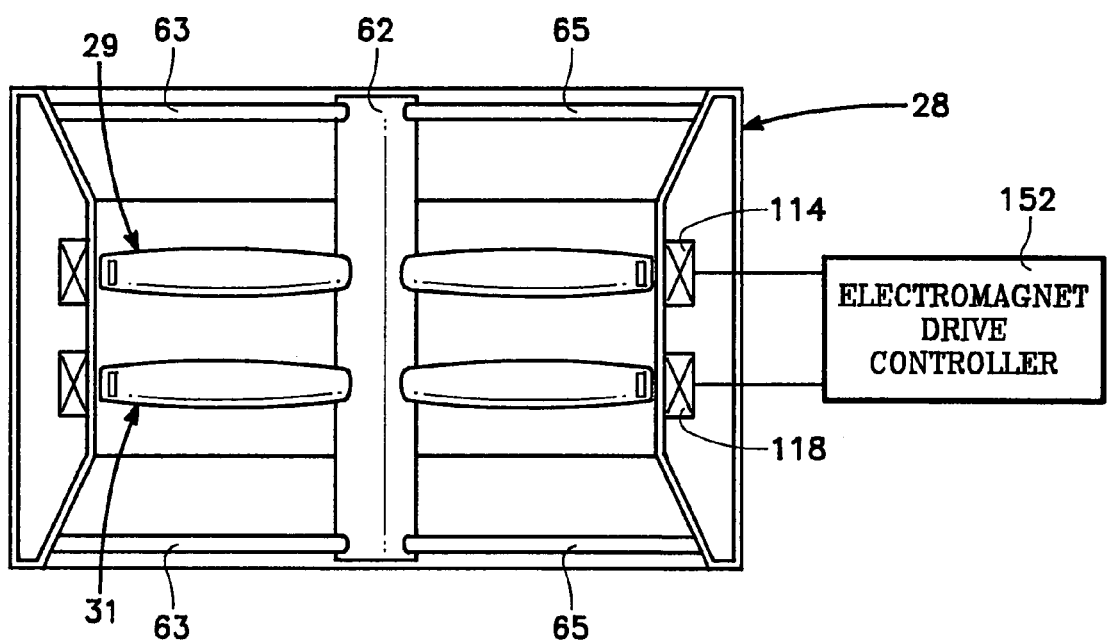
FIG. 6 is a side view illustrating the ducted housing and counter rotating propeller blades and the permanent magnet drive of FIG. 2.

Referring to FIGS. 2 and 6, as shown in FIG. 6, ducted housing 28 includes a stator 111 which has a stator core 113 and excitation windings 114 and 118 (FIG. 6 depicts both windings 114 and 118). The stator core 113 has a core portion 115 and a salient pole portion 116. In the core portion 115, a magnetic circuit is formed so to generate and then pass a magnetic flux to the salient pole portion 116. In this salient pole portion 116, the excitation windings 114 and 118, which are typically copper wire windings, are wound round in a concentrated manner.

At this time it should be noted that the stator core may be fabricated from any metallic material, such as iron or silicon steel or aluminum alloys, which generates a magnetic field of sufficient strength to rotate the counter rotating propeller blades 29 and 31 at speeds which provide lift for vehicle 30 and allow for flight of vehicle 30. Lightweight metals which allow for the generation of a magnetic field may also be used to fabricate the stator 111.

The rotor 112 comprises propeller blade shaft 62, the counter rotating propeller blades 29 and 31 and the plurality of permanent magnets 146. In the rotor 112, there are the plural permanent magnet insertion holes 148 in which are inserted the permanent magnets 146. The propeller blade shaft 62 is positioned in an axial direction with respect to the ducted housing 28 and the propeller blades. The permanent magnets 146 are inserted in and are in a fixed position with respect to the permanent magnet insertion holes 148.

As stated in the above, this embodiment of the permanent magnet electric rotating machine according to the present invention is a permanent magnet embedded structure electric rotating machine. By arranging the permanent magnets 146 around the rotor 112 in a ring-like form, a member formed between the adjacent permanent magnet insertion holes 148 can function as an auxiliary magnetic pole 150. Namely, the permanent magnets 146 are arranged separately and equally around the circumference at the same distance in the respective permanent magnet insertion hole 148 of the rotor 112 which is the counter rotating propeller blades 29 and 31.

A control apparatus (shown in the FIG. 6 as electromagnetic drive controller 152) can control a composite force of an armature electromotive drive force by exciting windings 114 and 118 to cause a rotation direction of the propeller blades 29 and 31. Winding 114 when excited causes rotation of propeller blade 29, while winding 118 cause rotation of propeller blade 31. Electromagnetic drive controller 152 controls the magnitude and direction of current flow through excitation windings 114 and 118 which, in turn, allows for control of and adjustment to the speed of rotation and the direction of rotation of each of the pair of counter rotating propeller blades 29 and 31.

A magnetic flux generated from the winding 114 passes through the permanent magnets 146 of counter rotating propeller blades 29 and 31 and the auxiliary magnetic poles 150. A reluctant torque is then generated. This is particularly effective during a low speed operating condition of the permanent magnet electric rotating machine. And further since the above stated reluctant torque is added to an ordinary torque applied to the permanent magnets 146, a high torque for the counter rotating propeller blades is obtained.

The electromagnetic drive controller 152 controls the rotational speed and direction of rotation of each of the propeller blades 29 and 31. The electromagnetic drive controller 152 controls each of these functions by controlling the magnitude and direction of control flow through the windings 114 and 118.

At this time, it should be noted that the number of individual propeller blades can vary within the pair of counter rotating propeller blades/fans 29 and 31 illustrated in FIGS. 2 and 4. While FIGS. 2 and 4 depict eight blades for each of the pair of counter rotating propeller blades/fans 29 and 31 the number of individual blades can be increased substantially as long as the number remains an even number of individual blades. For example, each of the pair of counter rotating propeller blades can have sixteen individual blades with each individual blade having a permanent magnet. The permanent magnets are then arranged alternatively as north, south, north, south poles within each of the counter rotating propeller blades/fans 29.

While the preferred embodiment comprises a pair of counter rotating propellers, it should be understood that the teachings of the present invention may utilized in a single propeller driven vehicle.

From the foregoing, it is readily apparent that the present invention comprises a new, unique, and exceedingly useful counter rotating ducted fan having a permanent magnet drive, which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An aerial vehicle for air transportation comprising:
    (a) a vehicle body;
    (b) a cylindrical shaped ducted housing centrally located within said vehicle body, said cylindrical shaped ducted housing including:
        (i) first and second stators, said first stator being positioned in an upper portion of said ducted housing, and said second stator being positioned in a lower portion of said ducted housing;
        (ii) said first and second stators having a stator core and a plurality of excitation windings;
        (iii) said stator core for said first and second stators having a core portion and a stator salient pole portion, said core portion forming a magnetic circuit to generate a magnetic flux and then pass said magnetic flux to the stator salient pole portion of said stator core; and
        (iv) said first and second stators having said plurality of excitation windings wound round said stator salient pole portion for said first and second stators in a uniform and concentrated manner;
    (c) first and second counter rotating propellers rotatably mounted within said cylindrical shaped ducted housing, said first counter rotating propellers being positioned within the upper portion of said cylindrical shaped ducted housing, and said second counter rotating propellers being positioned within the lower portion of said cylindrical shaped ducted housing, said first and second counter rotating propellers being operative to provide vertical takeoff and landing and translational flight capabilities for said aerial vehicle;
    (d) said first and second counter rotating propellers having a plurality of equally spaced apart blades, each of said plurality of blades having a permanent magnet located at a tip of said blade; and
    (e) an electromagnetic drive controller connected to the plurality of excitation windings of said first and second counter rotating propellers, said electromagnetic drive controller providing electrical current to the excitation windings of said first and second counter rotating propellers to generate said magnetic flux, said magnetic flux passing through the permanent magnets for said first and second counter rotating propellers generating torque which when applied to the blades for each of said counter rotating propellers causes the blades for each of said counter rotating propellers to rotate.

2. The aerial vehicle of claim 1 wherein said plurality of blades for said first and second counter rotating propellers comprises eight equally spaced apart blades.

3. The aerial vehicle of claim 1 wherein said plurality of blades for said first and second counter rotating propellers an even number of said blades in a range of six equally spaced apart blades to sixteen equally spaced apart blades.

4. The aerial vehicle of claim 1 wherein said electromagnetic drive controller controls a magnitude and direction of current flow through the excitation windings of said first and second counter rotating propeller blades which allows for adjustments to and control of a rotational speed and a direction of rotation of each of said first and second counter rotating propeller blades.

5. The aerial vehicle of claim 1 wherein said excitation windings of said first and second counter rotating propellers are copper wire excitation windings.

6. The aerial vehicle of claim 1 wherein said first and second stators are fabricated from a metal selected from the group consisting of iron, aluminum alloys and silicon steel, said metal having electromagnetic properties which allow each of said first and second stators to generate a magnetic field of sufficient strength to rotate said first and counter rotating propellers.

7. The aerial vehicle of claim 1 wherein said permanent magnet for each of said plurality of blades is mounted within a permanent magnet insertion holes located at the tip of each blade.

8. The aerial vehicle of claim 1 wherein said permanent magnets are arranged alternatively as north, south, north, south poles within each of said first and second counter rotating propellers forming a ring structure at the periphery of each of said first and second counter rotating propellers.

9. The aerial vehicle of claim 1 further comprising a shaft mounted vertically within the interior of said ducted housing, said first and second counter rotating propeller blades being rotatably mounted on said shaft.

10. The aerial vehicle of claim 1 further comprising a plurality of direction control vane assemblies mounted within said cylindrical shaped ducted housing at a bottom end of said cylindrical shaped ducted housing, said plurality of direction control vane assemblies controlling directional movement of said aerial vehicle in a flight mode of operation, said plurality of direction control vane assemblies including:
    (a) first, second, third and fourth direction control vane assemblies configured to form a rectangle within said duct housing;
    (b) fifth and sixth aligned direction control vane assemblies positioned diagonally within said rectangle; and
    (c) seventh and eighth aligned direction control vane assemblies positioned diagonally within said rectangle, said seventh and eighth direction control vane assemblies being perpendicular to said fifth and sixth direction control vane assemblies.

11. An aerial vehicle for air and ground transportation comprising:
    (a) a vehicle body;
    (b) a cylindrical shaped ducted housing centrally located within said vehicle body, said cylindrical shaped ducted housing including:
        (i) first and second stators, said first stator being positioned in an upper portion of said ducted housing, and said second stator being positioned in a lower portion of said ducted housing;
        (ii) said first and second stators having a stator core and a plurality of excitation windings;

(iii) said stator core for said first and second stators having a core portion and a stator salient pole portion, said core portion forming a magnetic circuit to generate a magnetic flux and then pass said magnetic flux to the stator salient pole portion of said stator core; and (iv) said first and second stators having said plurality of excitation windings wound round said stator salient pole portion for said first and second stators in a uniform and concentrated manner;

(c) first and second counter rotating propellers rotatably mounted within said cylindrical shaped ducted housing, said first counter rotating propellers being positioned within the upper portion of said cylindrical shaped ducted housing, and said second counter rotating propellers being positioned within the lower portion of said cylindrical shaped ducted housing, said first and second counter rotating propellers being operative to provide vertical takeoff and landing and translational flight capabilities for said aerial vehicle;

(d) said first and second counter rotating propellers having a plurality of equally spaced apart blades, each of said plurality of blades having a permanent magnet located at a tip of said blade; and (e) an electromagnetic drive controller connected to the plurality of excitation windings of said first and second counter rotating propellers, said electromagnetic drive controller providing electrical current to the excitation windings of said first and second counter rotating propellers to generate said magnetic flux, said magnetic flux passing through the permanent magnets for said first and second counter rotating propellers generating torque which when applied to the blades for each of said counter rotating propellers causes the blades for each of said counter rotating propellers to rotate;

(f) a plurality of direction control vane assemblies mounted within said cylindrical shaped ducted housing at a bottom end of said cylindrical shaped ducted housing, said plurality of direction control vane assemblies controlling directional movement of said aerial vehicle in a flight mode of operation;

(g) a first wheel and axle assembly positioned at the rear end of said aerial vehicle, said first wheel and axle assembly including first and second drive wheels, the first drive wheel being rotatably mounted on one side of said of aerial vehicle and the second drive wheel being rotatably mounted on an opposite side of said aerial vehicle;

(h) a gasoline engine and transmission assembly operatively connected to said first wheel and axle assembly to provide power to said first and second drive wheels rotating said first and second drive wheels when said aerial vehicle is in a ground based mode of operation;

(i) a second wheel and axle assembly positioned at a front end of said aerial vehicle, said second wheel and axle assembly including first and second steerable wheels, the first steerable wheel being rotatably mounted on the one side of said aerial vehicle and the second steerable wheel being rotatably mounted on the opposite side of said aerial vehicle; and (j) a steering wheel mounted within a cockpit located in proximity to the front end of said aerial vehicle, said steering wheel being operatively connected to said second wheel and axle assembly to allow a user of said aerial vehicle to steer said first and second steerable wheels and maneuver said aerial vehicle on a roadway when said aerial vehicle is in said ground based mode of operation.

12. The aerial vehicle of claim 11 wherein said plurality of blades for said first and second counter rotating propellers comprises eight equally spaced apart blades.

13. The aerial vehicle of claim 11 wherein said plurality of blades for said first and second counter rotating propellers an even number of said blades in a range of six equally spaced apart blades to sixteen equally spaced apart blades.

14. The aerial vehicle of claim 11 wherein said electromagnetic drive controller controls a magnitude and direction of current flow through the excitation windings of said first and second counter rotating propeller blades which allows for adjustments to and control of a rotational speed and a direction of rotation of each of said first and second counter rotating propeller blades.

15. The aerial vehicle of claim 11 wherein said excitation windings of said first and second counter rotating propellers are copper wire excitation windings.

16. The aerial vehicle of claim 11 wherein said first and second stators are fabricated from a metal selected from the group consisting of iron, aluminum alloys and silicon steel, said metal having electromagnetic properties which allow each of said first and second stators to generate a magnetic field of sufficient strength to rotate said first and counter rotating propellers.

17. The aerial vehicle of claim 11 wherein said permanent magnet for each of said plurality of blades is mounted within a permanent magnet insertion holes located at the tip of each blade.

18. The aerial vehicle of claim 11 wherein said permanent magnets are arranged alternatively as north, south, north, south poles within each of said first and second counter rotating propellers forming a ring structure at the periphery of each of said first and second counter rotating propellers.

19. The aerial vehicle of claim 11 further comprising a shaft mounted vertically within the interior of said ducted housing, said first and second counter rotating propeller blades being rotatably mounted on said shaft.

20. The serial vehicle of claim 11 wherein said plurality of direction control vane assemblies comprise:

(a) first, second, third and fourth direction control vane assemblies configured to form a rectangle within said duct housing;

(b) fifth and sixth aligned direction control vane assemblies positioned diagonally within said rectangle; and (c) seventh and eighth aligned direction control vane assemblies positioned diagonally within said rectangle, said seventh and eighth direction control vane assemblies being perpendicular to said fifth and sixth direction control vane assemblies.

* * * * *